United States Patent

Dancasius et al.

[11] Patent Number: 6,003,931
[45] Date of Patent: Dec. 21, 1999

[54] SWIVELLING OR SLIDING BACKBOARD

[75] Inventors: Michael Dancasius, Wuppertal; Burkhard Minner, Köln/Bickendorf; Holger Huster, Plettenberg; Stefan Tielke, Meschede, all of Germany

[73] Assignee: Schnade GmbH & Co., KG, Germany

[21] Appl. No.: 09/068,179

[22] PCT Filed: Aug. 27, 1997

[86] PCT No.: PCT/EP97/04673

§ 371 Date: Sep. 17, 1998

§ 102(e) Date: Sep. 17, 1998

[87] PCT Pub. No.: WO98/09833

PCT Pub. Date: Mar. 12, 1998

[30] Foreign Application Priority Data

Sep. 4, 1996 [DE] Germany ............... 196 35 873

[51] Int. Cl.⁶ ............................................. B60J 5/02
[52] U.S. Cl. ................. 296/146.8; 296/106; 296/56; 296/901; 49/339; 49/340
[58] Field of Search ............... 296/106, 56, 146.8, 296/901; 49/339, 340

[56] References Cited

U.S. PATENT DOCUMENTS

| | | | |
|---|---|---|---|
| 2,422,912 | 6/1947 | Kling | 296/106 |
| 3,612,601 | 10/1971 | Himka et al. | 296/106 |
| 4,341,414 | 7/1982 | Chiba | 296/56 |
| 4,664,437 | 5/1987 | Queveau | 296/106 |
| 4,773,700 | 9/1988 | Sannomiya | 296/106 |
| 4,799,730 | 1/1989 | Harasaki | 296/56 |
| 4,822,098 | 4/1989 | Vogt et al. | 296/146.8 |
| 4,880,267 | 11/1989 | Ohya | 296/56 |
| 5,449,213 | 9/1995 | Kiley et al. | 296/56 |
| 5,876,086 | 3/1999 | Lagrou et al. | 296/56 |

FOREIGN PATENT DOCUMENTS

| | | | |
|---|---|---|---|
| 0196968 | 10/1986 | European Pat. Off. | 296/106 |
| 0111457 | 6/1987 | European Pat. Off. | |
| 0506514 | 9/1992 | European Pat. Off. | |
| 0695848 | 2/1996 | European Pat. Off. | |
| 2581000A | 10/1986 | France | 296/106 |
| 2695877 | 3/1994 | France | 296/146.8 |
| 002701686 A1 | 8/1994 | France | 296/56 |
| 002061407 | 6/1972 | Germany | 296/146.8 |
| 197710 | 10/1977 | Germany | 296/56 |
| 0146420 | 11/1981 | Japan | 296/56 |
| 358180316 | 10/1983 | Japan | 296/146.8 |
| 62-113615 | 5/1987 | Japan . | |
| 0175216 | 7/1987 | Japan | 296/106 |
| 0214014 | 9/1987 | Japan | 296/106 |
| 401032921 | 2/1989 | Japan | 296/146.8 |
| 406211049 | 8/1994 | Japan | 296/146.8 |
| 8-258568 | 10/1996 | Japan . | |
| 995407 | 6/1965 | United Kingdom | 296/56 |
| 2078628 | 1/1982 | United Kingdom . | |
| 2181699 | 4/1987 | United Kingdom | 296/146.8 |

OTHER PUBLICATIONS

Patent Abstracts of Japan, vol. 097, No. 002, Feb. 28, 1997.

Patent Abstracts of Japan, vol. 011, No. 330 (M–636), Oct. 28, 1987.

*Primary Examiner*—Joseph D. Pape
*Assistant Examiner*—Kiran Patel
*Attorney, Agent, or Firm*—Ostrolenk, Faber, Gerb & Soffen, LLP

[57] ABSTRACT

A swivelling or sliding hatchback of a vehicle is designed using materials of lower weight densities to form the inner and outer skins of the hatch, to reduce the overall weight of the hatch. The hatchback (1) includes a supporting frame (2) formed from an open or closed steel section, an outer skin (3) and an inner skin (4) formed from a light metal or plastic and mounted on the supporting frame (2) The inner skin (4) is essentially formed by reinforcing ribs (14) and by section rails (19). The hatchback of this structure is particularly suited for passenger vehicles.

17 Claims, 4 Drawing Sheets

SWIVELLING OR SLIDING BACKBOARD

BACKGROUND OF THE INVENTION

1. Field of the Invention

The invention relates to a swivelling or sliding hatch, in particular a hatchback for a vehicle, with an inner and an outer skin and with a glass pane and a lock mount fitted with a lock.

2. Description of the Related Art

Hatches of this type serve to close the rear opening of the body of an automobile or, when designed as a sliding hatch, to close side door openings or similar of the body. In the embodiment of a hatchback, the upper edge is hinged on the body by means of two hinges. In the lower region, a lock mount with a lock fitted in it is provided. The contour of the hatch depends on the design form of the body.

With the currently known hatchbacks, the outer and inner skins consist of sheet steel with the connection between them being made by welds. If desired, on the inside of the inner skin, a liner made from a plastic or a textile material can additionally be fitted. The currently known hatches are all cantilevered constructions. The weight of the hatches currently comprised of steel sheets is accordingly high.

SUMMARY OF THE INVENTION

An object of the invention is to provide a hatch of the type described above in such a way that a high inherent stability is maintained, while the weight of the hatch is nevertheless substantially reduced.

This object is achieved in accordance with the present invention in that the hatch comprises a supporting frame made from an open or closed hollow section, that the outer and the inner skins are made from a plastic and/or a light metal and are fastened to the supporting frame and that at least corner regions of the glass pane and the lock mount are located on the supporting frame.

The proposal in accordance with the invention allows the hatch to be made in a light-weight construction with the supporting frame being practically the only supporting part which bears strains placed on the hatch. The outer and the inner skins may thus, in contrast to the known versions, be made from materials with much lower weight densities than steel. Thus, both the outer and the inner skins can be made of plastic, or one skin can be made of plastic and the other of light metal, for example aluminum, or both skins can be made of light metal. The connection of the supporting frame to the outer and the inner skins can, for example, be made by gluing. This will depend on the materials from which the outer and the inner skins are made. As at least certain corner regions of the supporting frame are connected to the glass pane, this also has a stabilizing effect with regard to the total structure. Any attempt to violently open the hatch will destroy the lock mount, but as the lock mount is located on the supporting frame in accordance with the present invention, substantially higher forces must be applied to do so than previously so that increased security is achieved. Although a supporting frame made from a hollow section, can sufficiently withstand a normal amount of strains it is advantageous to use a closed hollow profile because the strain capacity is substantially increased despite the only negligibly increased weight.

In another embodiment of the subject invention, the supporting frame is formed as a hollow profile made of steel in order to utilize the technological benefits of steel such as an increased torsional strength and a higher strain capacity.

Preferably, the hatch is used as a hatchback and fastened by means of hinges to the body of the vehicle with the hinges being appropriately located along the top edge. It is then advantageous if the struts of the supporting frame have a U-shape in the region of the pane and if the struts located on each side of the lock mount are at an angle, preferably an obtuse angle, to each other. With vehicles, and particularly with motor cars, it is preferred that the loading height be as low as possible and the opening as wide as possible. Thus region of the outer skin located underneath the pane and allocated to the lock mount and also if necessary, this region of the inner skin, is formed as a rectangle so that the outside corner regions protrude outwards with respect to the struts of the supporting frame.

The supporting frame or the hollow section are designed in cross-section such that the outer areas are smooth and without seams, so that at least in the region of the abutting struts defining a U, the pane can be mounted on the supporting frame by an adhesive seam. By means of a suitable glue, a good seal capability is achieved so that it is not necessary to provide a separate gasket dispensed with. So that the outer and inner skins are also sufficiently stable outside the supporting frame, provided with reinforcing ribs. To allow a stable and visually well the outer and inner skins are designed transition from the upper edge of the hatchback to the abutting body, the hatch includes a top part disposed opposite the lock mount and formed as a hollow body which is releasably connected, preferably by means of screws, to the associated region of the supporting frame. Appropriately, the lower region of the inner skin below the glass pan is formed by means of an upper and lower section rail each of which is fixed to the outer skin on the inside.

Further preferred and important features of the invention and advantageous embodiments of the subject matter of the invention are described below in the following description of a preferred embodiment in conjunction with the drawings.

DETAILED DESCRIPTION OF THE PREFERRED EMBODIMENTS

Figure 1:
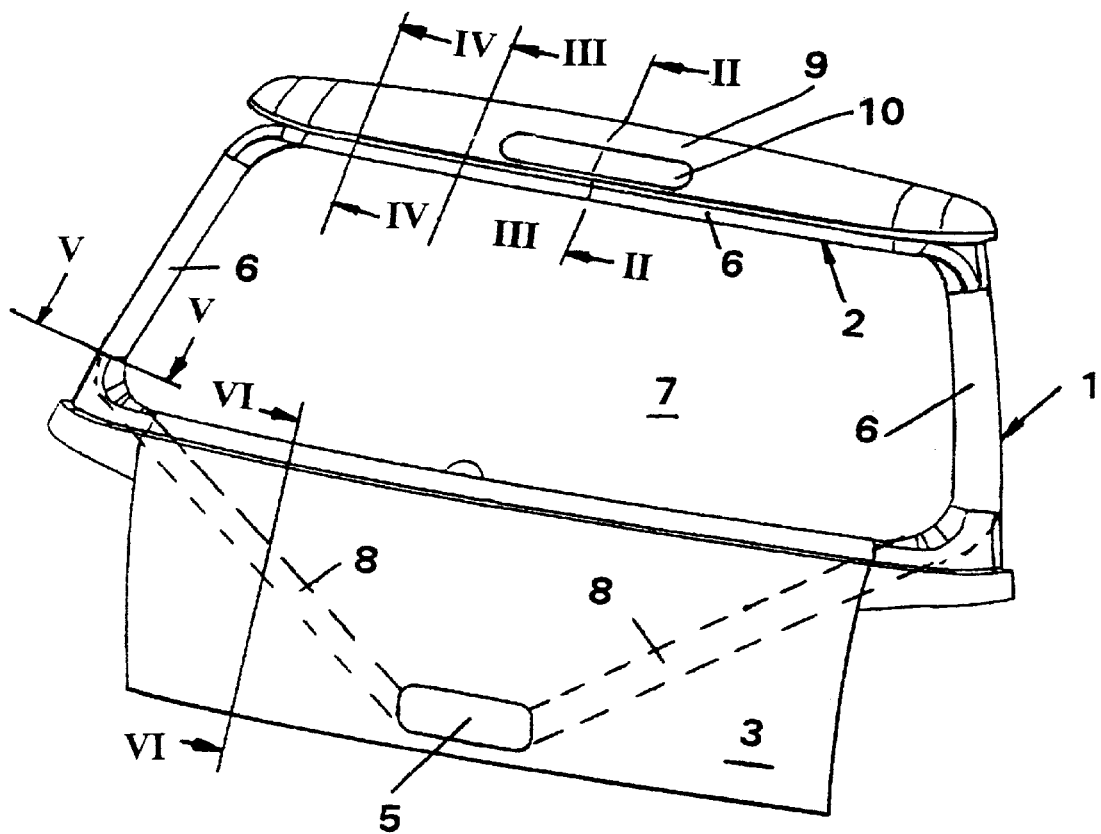
FIG. 1 shows a hatch formed as a hatchback in a perspective view with a view of the outside.
Figure 2:
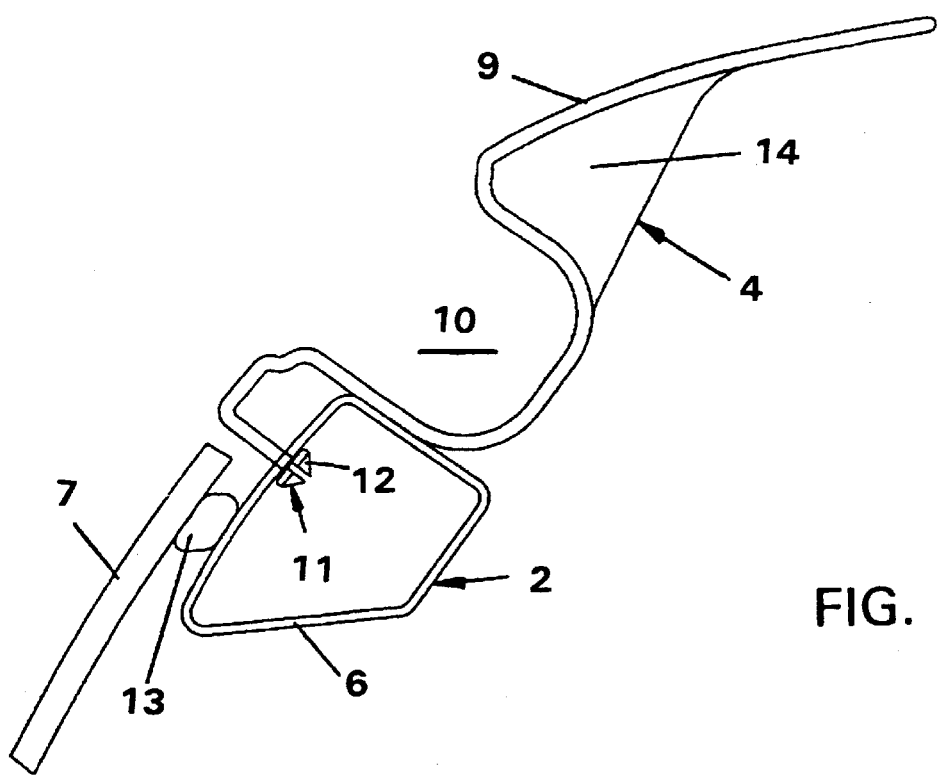
FIG. 2 shows the hatch in partial cross-section in accordance with the section symbol II—II in FIG. 1.

The hatch (1) shown in FIG. 1 consists essentially of a closed supporting frame 2 made from a closed hollow section of steel and positioned between the outer skin 3 and the inner skin 4. The hatchback 1 is hinged to the body of the vehicle (not shown) by two hinges (not shown) fastened at the top edge. On the opposite lower edge a lock mount 5, in which a lock (not shown) is disposed centrally on the supporting frame 2 in a manner also not shown in detail. The upper region of the supporting frame 2 is formed in a U shape so that the three struts 6 delimit a field to accept a glass pane 7. The adjacent lower region of the supporting frame 2 is designed in a V-shape so that the two struts 8 guided together at the lock mount 5 are at an obtuse angle to each other. The outer skin 3 and the inner skin 4 are designed in a rectangular shape in this region so that the edge regions protrude outwards with respect to the supporting frame. It can be seen from the figures that the outer skin 3 and the inner skin 4 extend essentially over the lower region. FIGS. 1 to 4 show that on the upper, substantially horizontally running strut 6 of the supporting frame 2, a top part 9 is mounted in the form of a section rail, which top part 9 faces the side of the strut facing away from the glass pane 7. FIGS. 1 and 2 show that the top part 9 is provided with a central mounting chamber 10 for a high-set rear lamp. It can be further seen from FIG. 1 that it is sufficient for the glass pane 7 to be connected to the supporting frame 2 at its corner regions.

Figure 3:
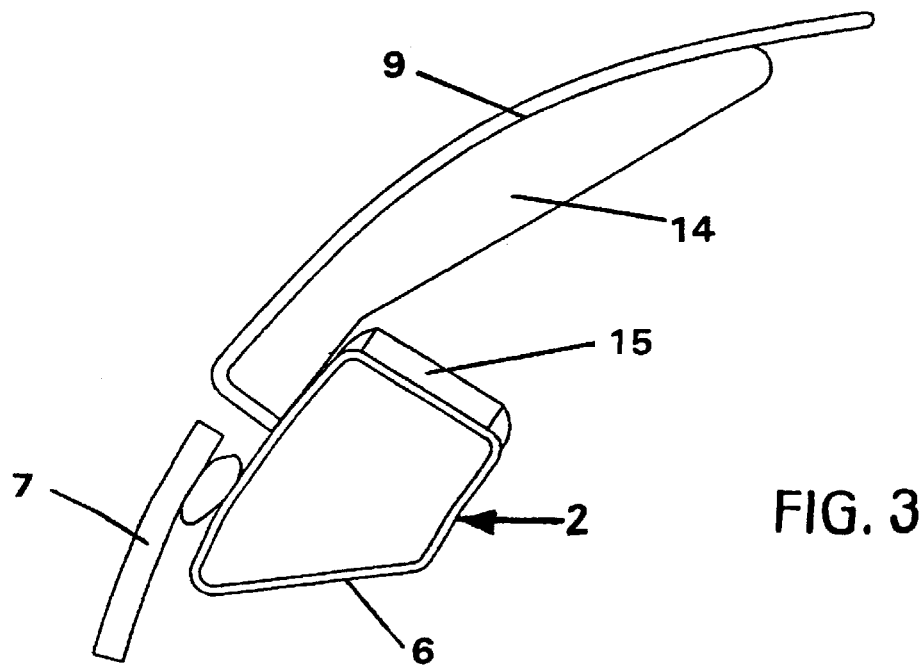
FIG. 3 shows the hatch in partial cross-section in accordance with the section symbol III—III in FIG. 1.
Figure 4:
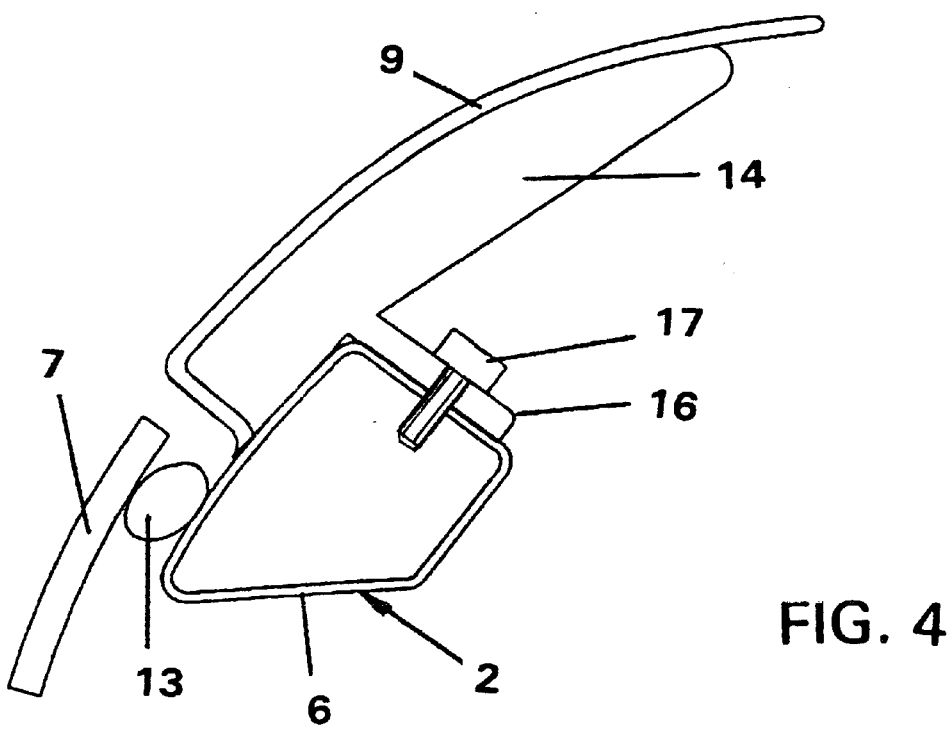
FIG. 4 shows the hatch in partial cross-section in accordance with the section symbol IV—IV in FIG. 1.

FIG. 2 shows that the inner skin 4 is formed in the region of the top part 9 by the free edges of the reinforcing ribs 14 formed on the inside of the outer skin. Furthermore, it can be seen from FIG. 2 that the top part 9 possesses two correspondingly elastic detent mechanisms 11, 12 for connection with the strut 6 of the supporting frame 2. FIGS. 2 to 6 additionally show that the struts 6, 8 of the frame 2 possess an asymmetrical trapezoidal closed cross-section. Furthermore, it can be seen from the drawing that the pane 7 abuts the upper region of the hatchback 1 and is fastened to the struts 6 of the supporting frame 2 by means of a circumferential adhesive seam 13. In FIGS. 2 to 4, reinforcing ribs 14 are provided on the top part 9 in order to stabilize the top part 9 in the embodiment shown.

A comparison of FIGS. 2 and 3 shows that hinges 15 are provided at either side of the mounting chamber 10 with one hinge portion being fastened to the supporting frame 2 and the other hinge portion being fastened to the vehicle body to fix the hatchback 1 to the edge of the vehicle body. FIG. 3 shows that the free edge of the reinforcing ribs 14 springs back in the hinge region.

FIG. 4 shows that in the edge regions, the reinforcing ribs 14 formed on the top part 9 include a mounting flange 16 abutting the strut 6 of the supporting frame 2 to connect the top part 9 to the supporting frame 2 by means of screws 17.

Figure 5:
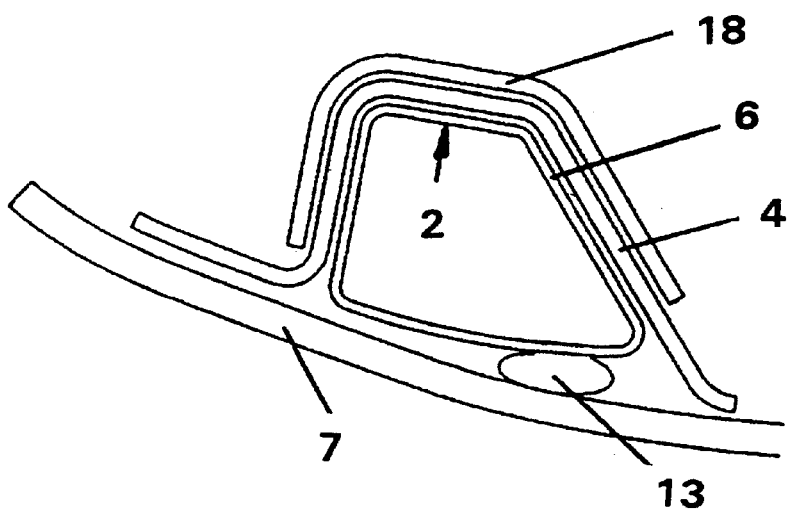
FIG. 5 shows the hatch in partial cross-section in accordance with the section symbol V—V in FIG. 1.

FIG. 5 shows that in the bottom corner region of the pane 7, the sealing between the pane 7 and the inner skin 4 is effected without a gasket, while on the regions of inner skin 4 corresponding to the surfaces of the strut 6 not facing the glass pane 7, an inside section gasket 18 overlaps the strut 6 of the supporting frame 2.

Figure 6:
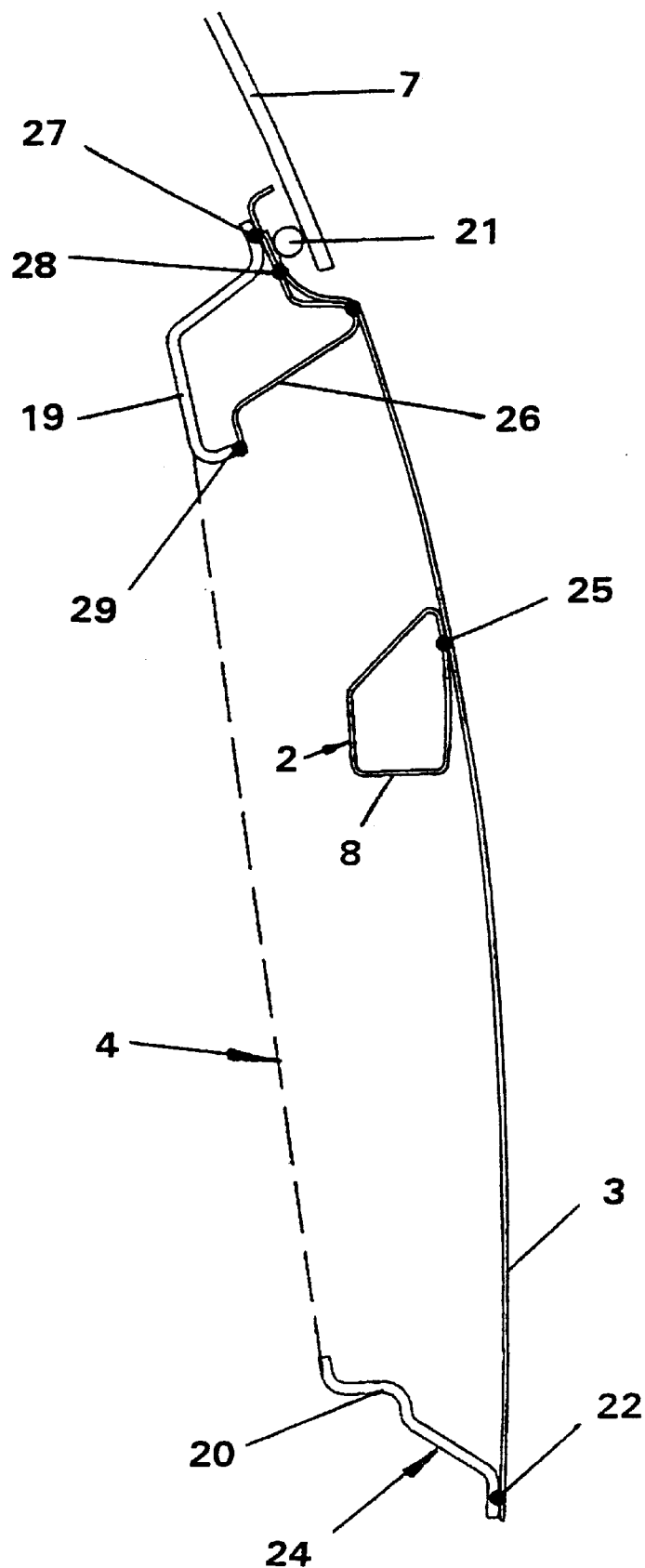
FIG. 6 shows the hatch in partial cross-section in accordance with the section symbol VI—VI in FIG. 1.

FIG. 6 shows that the inner skin 4 is formed in the region of the diagonally positioned struts 8 of the supporting frame 2 by an upper section rail 19 and a lower section rail 20 which are connected to the outer skin 3 by means of adhesive seams 21, 22. The strut 8 of the supporting frame 2 is positioned approximately centrally between the upper and lower section rails 19, 20. The lock mount not shown in detail is fixed to the supporting frame 2 by means of correspondingly designed retaining elements. The cross-section of the lower section rail 20 includes a diagonally positioned, rising leg so that a sealing surface 24 is formed. The strut 23 of the supporting frame 2 is connected to the outer skin 3 by means of an adhesive seam 25. In addition, FIG. 6 shows that between the upper profile rail 19 and the associated edge of the outer skin an assembly bearing rail 26 is located which is fixed in place by three adhesive seams 27, 28, 29.

The figures show that the inner skin 4 is essentially formed by the section rails 19, 20 and by the free edges of the reinforcing ribs 14 of the outer skin 3.

REFERENCE SYMBOL LIST

1. Hatchback
2. Supporting frame
3. Outer skin
4. Inner skin
5. Lock mount
6. Strut
7. Glass pane
8. Strut
9. Top part
10. Mounting chamber
11. Detent mechanism
12. Detent mechanism
13. Adhesive seam
14. Reinforcing rib
15. Hinge
16. Mounting flange
17. Screw
18. Section gasket
19. Upper section rail
20. Lower section rail
21. Adhesive seam
22. Adhesive seam
24. Gasket surface
25. Adhesive seam
26. Assembly bearing rail
27, 28, 29 Adhesive seam

What is claimed is:

1. A swivelling or sliding hatch for a vehicle, comprising:
   a supporting frame having first and second sides;
   an outer skin made from a plastic or a light metal, the outer skin being mounted on the first side of the supporting frame;
   an inner skin made from a plastic or a light metal, the inner skin being mounted on the second side of the supporting frame;
   a glass pane having at least corner regions thereof fixed on the supporting frame; and
   a lock mount fixed on the supporting frame.

2. A hatch in accordance with claim 1, wherein the supporting frame is hollow in cross-section and is formed from steel.

3. A hatch in accordance with claim 1, wherein the hatch is formed as a hatchback door which is pivotable with respect to the vehicle body by means of hinges, wherein the supporting frame is U-shaped in the region of the pane and V-shaped at a lower region thereof so that the lock mount forms the base of the V-shape.

4. A hatch in accordance with claim 3, wherein a region of the outer skin disposed below the pane and in which the lock mount is fixed, and a corresponding region of the inner skin are formed with a rectangular shape so that outer corner regions of the inner and outer skins protrude outwards with respect to the supporting frame.

5. A hatch in accordance with claim 3, wherein the glass pane is fastened to the supporting frame at least in each corner region of the U-shaped portion of the supporting frame by means of an adhesive seam.

6. A hatch in accordance with claim 1, wherein at least one of the outer and inner skin include reinforcing ribs.

7. A hatch in accordance with claim 1, wherein the outer and inner skins each have an upper region which is releasable connected to an associated region of the supporting frame by screws.

8. A hatch in accordance with claim 3, wherein the lower regions of the inner skin and the outer skin over the V-shaped portion of the supporting frame are connected by upper and lower section rails which are each fixed to an inner surface of the outer skin.

9. A hatch in accordance with claim 8, wherein the lower section rail is shaped such that its cross-section includes a rising leg which forms a gasket surface.

10. A hatch in accordance with claim 8, further comprising an assembly bearing rail mounted between the upper section rail and an associated edge of the outer skin connected at the assembly bearing rail.

11. A hatch in accordance with claim 1, wherein a top region of the outer skin includes at least one central mounting chamber for a rear lamp.

12. A hatch in accordance with claim 11, wherein the outer skin comprises detent mechanisms in the region of the mounting chamber for connection to the supporting frame.

13. A hatch in accordance with claim 1, wherein the supporting frame has a cross-section which is uniform along its length and which is shaped as an asymmetrical trapezoid.

14. A hatch in accordance with claim 1, wherein the pane is fastened to the supporting frame around an upper region of the hatchback by means of a circumferential adhesive seam.

15. A hatch in accordance with claim 11, further comprising hinges at either side of the mounting chamber to provide an articulated connection of the hatch to the edge of the vehicle body, wherein one part of each hinge is fastened to the supporting frame and the other part of each hinge is fastened to the edge of the vehicle body.

16. A hatch in accordance with claim 6, wherein the reinforcing ribs include mounting flanges at edge regions thereof which abut the supporting frame, and which are connected to the supporting frame by means of screws.

17. A hatch in accordance with claim 1, further comprising a section gasket overlapping the supporting frame at regions corresponding to lower corner regions of the glass pane, the section gasket being provided to seal the pane to the supporting frame, and wherein a lower edge of the pane is sealed a corresponding edge of the inner skin.

* * * * *

UNITED STATES PATENT AND TRADEMARK OFFICE
CERTIFICATE OF CORRECTION

PATENT NO. : 6,003,931
DATED : December 21, 1999
INVENTOR(S) : Michael DANCASIUS, et al.

It is certified that error appears in the above-indentified patent and that said Letters Patent is hereby corrected as shown below:

Please correct the name of the Assignee as follows:

On the cover sheet of the patent, [73] Assignee, should read:

--Schade GmbH & Co., KG, Germany--.

Signed and Sealed this

Twenty-third Day of January, 2001

Attest:

Attesting Officer

Q. TODD DICKINSON

Commissioner of Patents and Trademarks